United States Patent [19]

Lucas, Jr. et al.

[11] Patent Number: 5,756,655
[45] Date of Patent: May 26, 1998

[54] PREPARATION OF PHENOLIC POLYMERS BY ARALKYLATION REACTIONS

[75] Inventors: Edward Lucas, Jr., Peachtree City, Ga.; Alan K. Randall, Delaware, Ohio; David A. Hutchings, Tucker, Ga.; David Valdez, Snellville, Ga.; Ellen V. Nagy, Covington, Ga.

[73] Assignee: Georgia-Pacific Resins, Inc., Atlanta, Ga.

[21] Appl. No.: 782,028

[22] Filed: Jan. 10, 1997

[51] Int. Cl.$^6$ .................................................. C08G 67/02
[52] U.S. Cl. ............................................................. 528/392
[58] Field of Search .................................... 528/176, 392

[56] References Cited

U.S. PATENT DOCUMENTS

| | | | |
|---|---|---|---|
| 2,224,837 | 12/1940 | Rosenthal et al. | 528/176 |
| 2,665,312 | 1/1954 | Ohimann et al. | 528/271 |
| 2,687,383 | 8/1954 | D'Alelio | 528/176 |
| 3,177,166 | 4/1965 | Gregory et al. | 528/176 |
| 3,328,489 | 6/1967 | Murdock | 528/271 |
| 3,420,915 | 1/1969 | Braithwaite | 528/271 |
| 3,546,173 | 12/1970 | Hunt | 528/272 |
| 3,808,279 | 4/1974 | Buysch et al. | 528/176 |
| 3,936,510 | 2/1976 | Harris et al. | 528/176 |
| 3,996,198 | 12/1976 | Wang et al. | 528/176 |
| 3,996,199 | 12/1976 | Weinshenker et al. | 528/176 |
| 4,085,085 | 4/1978 | Tsuchiya et al. | 528/176 |
| 4,127,564 | 11/1978 | Sanborn | 528/481 |
| 4,210,733 | 7/1980 | Hayashi et al. | 525/529 |
| 4,307,012 | 12/1981 | Serres, Jr. | 252/52 R |
| 4,310,657 | 1/1982 | Serres, Jr. | 528/212 |
| 4,380,554 | 4/1983 | Serres, Jr. | 524/84 |
| 4,432,921 | 2/1984 | Haars et al. | 264/109 |
| 4,639,503 | 1/1987 | Hara et al. | 528/92 |
| 4,666,974 | 5/1987 | Keskey et al. | 524/547 |
| 4,690,995 | 9/1987 | Keskey et al. | 526/286 |
| 4,701,517 | 10/1987 | Daughenbaugh, Jr. | 528/205 |
| 4,824,929 | 4/1989 | Arimatsu et al. | 528/205 |
| 4,897,438 | 1/1990 | Kikuchi et al. | 524/342 |
| 4,900,671 | 2/1990 | Pokora et al. | 435/156 |
| 4,927,905 | 5/1990 | Bogan | 528/205 |
| 4,968,759 | 11/1990 | Kikuchi et al. | 525/534 |
| 5,102,962 | 4/1992 | Kikuchi et al. | 525/534 |
| 5,270,403 | 12/1993 | Mori | 525/534 |
| 5,674,970 | 10/1997 | Hutchings et al. | 528/205 |

FOREIGN PATENT DOCUMENTS

| | | |
|---|---|---|
| 0 075 771 | 4/1983 | European Pat. Off. . |
| 0 240 762 | 10/1987 | European Pat. Off. . |
| 506080 A2 | 9/1992 | European Pat. Off. . |
| 2 337 185 | 7/1977 | France . |
| 28 16 112 | 4/1978 | Germany . |
| 3541210 A1 | 5/1986 | Germany . |
| 8-73570 | 3/1996 | Japan . |
| WO 97/03103 | 1/1997 | WIPO . |

OTHER PUBLICATIONS

P. L. Dubin et al., "Observed Bimodality in a Branched Condensation Polymerization", pp. 117–120.

P. L. Dubin et al., "Bimodal Molecular Weight Distributions of a Branched Condensation Polymer," *J. Polymer Science*, vol. 20, pp. 1709–1716 (1982).

Patent Abstracts of Japan, vol. 018, No. 639 (C–1282), 6 Dec. 1994 & JP 06 248021 A (Dainippon Ink & Chem), 6 Sep. 1994.

*Primary Examiner*—Terressa Mosley
*Attorney, Agent, or Firm*—Banner & Witcoff, Ltd.

[57] ABSTRACT

The present invention is directed to a method for preparing phenol aralkylation polymers by reaction among a phenolic monomer, a styrenic monomer and an aryl diolefin, characterized by the absence of a solvent, wherein a phenolic monomer is initially aralkylated in the presence of an acid catalyst with a first portion of at least one styrenic monomer to obtain an aralkylated phenol, the aralkylated phenol is reacted with an aryl diolefin to obtain a phenol aralkylation polymer, and then optionally, (though preferably) the phenol aralkylation polymer is further aralkylated with a second portion of at least one styrenic monomer.

8 Claims, No Drawings

PREPARATION OF PHENOLIC POLYMERS BY ARALKYLATION REACTIONS

BACKGROUND OF THE INVENTION

1. Field of the Invention

This invention is directed to an improved method for preparing phenol aralkylation polymers by reactions involving a phenolic monomer, a styrenic monomer and a divinyl aromatic monomer. The invention is particularly directed to a method for preparing phenol aralkylation polymers which avoids any need to use an inert solvent in the reaction medium. The invention has particular applicability for the preparation of commercial size batches of the phenol aralkylation polymer.

2. Description of Related Art

Recently, a new class of phenolic-type polymers have been developed by co-reaction among a phenolic monomer, at least one styrene derivative and a divinyl aromatic monomer or aryl diolefin. In a first embodiment, these polymers can be prepared by initially aralkylating a phenolic monomer with the at least one styrene derivative to obtain an aralkylated phenol, and thereafter reacting the aralkylated phenol with the aryl diolefin to obtain the phenol aralkylation polymer, having aralkylated phenols joined together with the aryl diolefin with the primary linkage at the ortho position. The styrene monomer is added to a reaction medium containing the phenolic monomer and the acid catalyst, possibly in the presence of an inert solvent such as o-xylene. Phenol aralkylation polymers also can be prepared, in a second embodiment, by reacting a phenolic monomer initially with the aryl diolefin to obtain a phenol/aryl diolefin polymer and then aralkylating the phenol/aryl diolefin polymer with at least one styrene derivative to obtain a phenol aralkylation polymer, with a portion of the phenolic linkages being para in orientation. In the case of polymers made using bisphenol-A as the phenolic monomer, the bisphenol-A generally is melted in the presence of an inert solvent before adding the diolefin monomer and catalyst.

SUMMARY OF THE INVENTION

The present invention is directed to an improved method for preparing a class of such phenol aralkylation polymers exhibiting improved oil solubility, and improved compatibility with oil and alkyd-based polymers, as well as with urethanes, epoxies and acrylates. The present invention is particularly directed to a method that can produce large commercial-sized quantities (i.e., on a scale greater than one to ten thousand pounds) of the phenol aralkylation polymer at high purity while avoiding the need for solvent stripping.

The present invention is specifically directed to a method for preparing such phenol aralkylation polymers by reaction among a phenolic monomer, a styrenic monomer and an aryl diolefin, in the absence of a solvent, by initially aralkylating a phenolic monomer with a first portion of at least one styrenic monomer to obtain an aralkylated phenol, reacting the aralkylated phenol with an aryl diolefin to obtain phenol aralkylation polymer, and then optionally, (though preferably) further aralkylating the phenol aralkylation polymer with a second portion of at least one styrenic monomer. The preliminary aralkylation reaction between the phenolic monomer and the first portion of the styrenic monomer serves to direct the subsequent reaction of the partially aralkylated phenolic monomer with the aryl diolefin to the formation of coupled aralkylation products through a combination of resonance, inductive and steric effects. Preferably, the initial aralkylation reaction is initiated by forming a reaction medium or mixture of the styrenic monomer and the phenolic monomer, heating the mixture to a first elevated temperature and then slowly adding the acid catalyst to allow the reaction mixture to exotherm to a second elevated temperature.

Aralkylated polymers made by the invention, particularly in large commercial scale batches, are expected to have a low polydispersity and a well-defined (i.e., controlled) functionality making them useful for reaction into other polymer systems to increase the strength/modulus of the resulting polymeric adducts. As noted, the process of the invention is advantageous in avoiding the need for a solvent, which minimizes and in many cases eliminates the formation of any waste streams created for example by solvent stripping the polymer product. Instead, the styrenic monomer functions as a reactive solvent for the phenolic monomer, allowing the phenolic monomer to be heated to reaction temperatures, while minimizing heat induced degradation that oftentimes accompanies the melting of commercial sized quantities of the phenolic monomer. The method of the present invention is especially applicable to those phenolic monomers of a relatively high melting point such as bisphenol-A and bisphenol-F.

It is to be understood that both the foregoing general description and the following detailed description are exemplary and explanatory only and are not restrictive of the present invention as claimed.

DETAILED DESCRIPTION OF THE INVENTION

The present invention is directed to a method for preparing a class of phenol aralkylation polymers which exhibit good oil solubility and show a decreased tendency to darken over time. The phenol aralkylation polymers of the present invention have substantially reduced phenol and formaldehyde emissions, and have excellent adhesion and corrosion properties. Also, the products of the invention have high solubility in non-aromatic (Hazardous Air Pollutants ("HAP's") free) solvents. The phenolic aralkylation polymers made by the method of the invention are also useful for incorporation with many other polymers which include, but are not limited to, alkyds, urethane, epoxy, and acrylate polymer systems. The increase in aromatic character and especially the lower polydispersity expected by the practice of the present invention result in an enhancement in the compatibility of the phenolic aralkylation polymer with the aforementioned polymer types, and also generally lead to an enhancement of physical properties, adhesion, and barrier property performance.

The term "polymer" used throughout the specification and claims is intended to embrace adducts having a wide range of molecular weights (including products often referred to as oligomers) made by reacting the various monomers used in practicing the present invention.

The phrase "commercial-sized quantities" and phrases of similar import are intended to embrace those conditions of scale where one generally encounters significant non-uniformities in the processes of heat and mass transfer. For instance, when preparing batches of phenol aralkylation polymer of one thousand pounds or greater, and especially batches of ten thousand pounds or greater, melting of the solid phenolic monomer on that scale presents a significant heat transfer problem to obtain rapid melting of the phenolic monomer without an undesired amount of degradation.

It will be recognized by those skilled in the art that the molecular structures illustrated in the following specification represent idealized average structures. The actual polymer products constitutes a complex mixture of molecules typically containing a range of polymer products analogous to the idealized structure.

The phenol aralkylation polymers produced by the method of the present invention are derived from a phenolic monomer, at least one styrenic monomer and an aryl diolefin or divinyl aromatic monomer. In addition to the phenolic monomer, styrenic monomer and aryl diolefin, other reactants may be introduced to produce a product with particular properties.

The process of the present invention avoids the need to use an inert solvent to assist in the heating of the phenolic monomer, possibly with melting, to a suitable reaction temperature, and instead uses the solvating action of at least a portion of the styrenic monomer to produce a solution or dispersion of the phenolic monomer, before initiating the aralkylation reaction. In this way, potential degradation of the phenolic monomer can be reduced and possibly avoided, while at the same time the purity of the polymer product can be maximized without the complication of solvent stripping. The solution or dispersion produced using the styrenic monomer provides a suitable mass of fluid which allows the desired reactions for forming the aralkylation polymer to occur with appropriate heat and mass transfer. Indeed, the invention capitalizes on the strong exothermic character of the aralkylation reaction to heat the reaction mixture to the desired temperature for both the aralkylation and aryl diolefin coupling reactions. The initial aralkylation reaction also permits the subsequent coupling reactions involving the aryl diolefin to progress with essentially no risk of gelation even at higher aryl diolefin to phenolic monomer mole ratios, i.e., at mole ratios near 1 and above.

Having established a solution or dispersion of the phenolic monomer in the styrenic monomer at an appropriate temperature, often in the range of 100° to 110° C., an acid aralkylation catalyst is added to the solution/dispersion to initiate the aralkylation reaction. The reaction is strongly exothermic, and the heat that is generated facilitates self-heating of the reaction mixture to a temperature that insures homogeneity for the subsequent reaction of the aralkylated phenol with the aryl diolefin. Typically, the catalyst is added at a controlled rate such that the reaction mass experiences a 40° to 70° C. temperature increase (exotherm) during the initial aralkylation. This auto-heating represents another advantage of the present invention as it constitutes an efficient heating method that further contributes to the minimization of phenolic monomer degradation. Once the reaction mass reaches a temperature of about 130° to 190° C., preferably 140° to 170° C., the reaction mass generally becomes homogeneous. The reaction is allowed to proceed for a time sufficient to consume at least about 95% of the styrenic monomer, which often takes about 5 to 30 minutes at the preferred temperatures. The invention has particular advantage when using a high melting point (and possibly temperature sensitive) phenolic monomer such as resorcinol, catechol, bisphenol-A, bisphenol-F and hydroquinone. These phenolic monomers melt at a temperature in excess of about 90° C., and prolong exposure at elevated temperatures often contributes to their degradation.

The (pre)reaction of a first portion of at least one styrenic monomer with the phenolic monomer partially blocks and activates the reaction sites of the phenolic monomer before the addition of the aryl diolefin which subsequently links or couples the partially aralkylated species together. The low polydispersities expected in the ultimate products of the invention are believed to be due to this controlled (pre) reaction. As a result, the amount of the first portion of the at least one styrenic monomer should be sufficient to obtain the inductive and resonance effects in the subsequent coupling reaction, while insuring sufficient fluidity to assist the mass and heat transfer processes on-going in the reator. In this regard, the styrenic monomer should be present in the initial reaction mixture in an amount of 0.4 to 1.5 mole per mole of phenolic monomer, and more preferably from 0.6 to 1.0 mole of styrenic monomer per mole of phenolic monomer, present during the initial aralkylation. In this way, sufficient activation of the phenolic monomer for the subsequent coupling reaction is obtained without over aralkylation of the phenolic monomer such as to interfere with the subsequent coupling reaction. These amounts of styrenic monomer also generally insure a sufficient amount of fluidity to the reaction mixture to realize the advantages on enhancement of heat ans mass transfer processes of the present invention. As noted above, in cases where the aryl diolefin is intended to be added at levels near and above a mole ratio of one mole of aryl diolefin to one mole phenolic monomer, the initial aralkylation reaction provided by the present invention also prevents gelation of the polymer during synthesis.

Following the (pre)reaction of the phenolic monomer with the first portion of at least one styrene derivative, the aryl diolefin is added to the reaction mixture at the then-prevailing elevated temperature, generally between 130° to 180° C., and preferably a temperature of about 160° C. A high temperature promotes the desired coupling reaction that contributes to the formation of an aralkylated polymer of a higher molecular weight and an expected lower polydispersity.

The process also permits the formation of aralkylation polymers with sterically hindered styrenic monomers, such as isopropinyl benzene, while avoiding the formation of an excess of unwanted vinyl homopolymers.

Reactants

The styrenic monomers used in the process of the present invention may be any of the aryl substituted alkene hydrocarbons. Examples include styrene, α-methyl styrene, p-methyl styrene, p-t-butyl styrene, α-methyl-p-methyl styrene, β-methyl styrene, m-ethyl styrene, p-ethyl styrene, p-vinyl toluene, mixed vinyl toluenes, mixed t-butyl styrenes, mixed ethyl styrenes, mixed t-butyl styrenes with di-t-butyl styrenes, isopropenyl naphthalene, 2-methyl-1, 1-diphenyl propene, 1-phenyl-1-pentene, and the like. Mixed styrenic monomers means a mixture of, for example, p- and m- t-butyl styrenes. The preferred styrenic monomers are styrene and homologs of styrene of the formula:

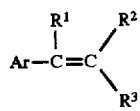

Where Ar may be phenyl, naphthyl, biphenyl, or substituted phenyl, naphthyl, or biphenyl.

Substituted phenyls are illustrated by the following:

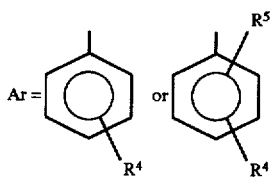

Where $R^4$ and $R^5$ are independently methyl, ethyl, $C_3$ to $C_{10}$ alkyl, or a halogen $R^1$, $R^2$ and $R^3$ are independently hydrogen, an alkyl radical containing 1 to 5 carbon atoms, an aromatic or an alkyl aromatic. $R^1$, $R^2$ and $R^3$ can be other functionalities such as a carboxyl as in the case of cinnamic acid.

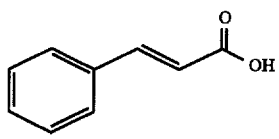

Such systems are particularly valuable as a means of introducing carboxyl functionality on a phenolic monomer:

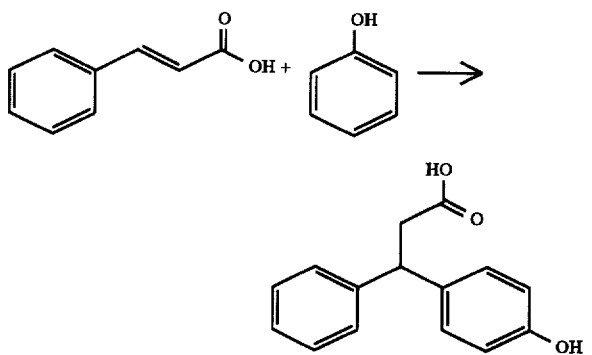

Esters of styrenic monomers may also be used.

$R^1$, $R^2$ and $R^3$ can be carboxyl (—$CO_2H$) or alkoxy (—O—R) groups.

Preferably, the styrenic monomer is styrene, α-methyl styrene, p-t-butyl styrene, m-ethyl styrene, p-ethyl styrene, p-vinyl toluene, mixed vinyl toluenes, mixed t-butyl styrenes, mixed ethyl styrenes, mixed t-butyl styrenes with di-t-butyl styrenes, or mixtures thereof The divinyl aromatic monomer or aryl diolefin can be represented by the following formula:

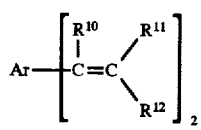

Wherein Ar is benzene, naphthalene, or biphenyl; $R_{10}$, $R_{11}$ and $R_{12}$ independently are a hydrogen or an alkyl radical containing 1–5 carbon atoms. The orientation on the benzene ring is meta or para or mixtures thereof Possible substitutions for naphthalene include 1-3, 1-4, 1-5, 1-6, 1-7, 1-8, 2-4, 2-5, 2-6, 2-7 or 2-8 and corresponding mixtures thereof.

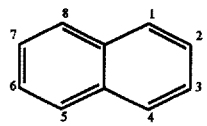

Possible substitutions for biphenyl include 1-3, 1-2', 1-1', 1-3', 2-3', and 3-3', and corresponding mixtures thereof.

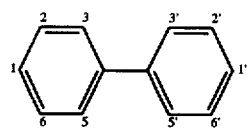

The aromatic nucleus may be substituted with various R groups, for example, methyl and t-butyl.

Preferably the aryl diolefin is m- or p-diisopropenyl benzene (DIPB) or their m, p mixtures or mixed m/p divinylbenzene (DVB) of any of the commercially available concentrations. m-DIPB is commercially available at a 98% concentration. DVB is available at concentrations of, for example, 53%, 62%, and 80%. DVB concentrations also contain ethyl-styrene (vinyl ethyl benzene). For instance, 80% DVB contains approximately 20% ethyl styrene. Diols derived from DIPB such as m or p diols of diisopropyl benzene are acceptable diolefin materials.

Diols derived from DIPB such as m or p diols of diisopropenyl benzene are acceptable precursor materials for aryl diolefins since they can be considered blocked aryl diolefins, i.e., they react as a blocked diolefin.

Phenol monomers

Phenolic monomers for practicing the present invention constitute phenols which contain at least two free reactive positions. For example, in the case of phenol and substituted phenols, monomers contain at least two free reactive (ortho- or para-positions). Examples include phenol itself, o-, p- and m-cresol, m-isopropyl phenol, 3,5-xylenol, 3,5-diisopropyl phenol and mixtures of these compounds. Specific classes include:

I. Phenolic monomers containing mononuclear phenolic substituents are shown by the formula:

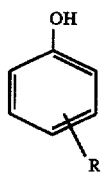

Substitution may be ortho, meta, or para. R may be methyl, ethyl, isopropyl, n-propyl, t-butyl, isobutyl, n-butyl, 5–10 aliphatic substituents, phenyl, or a substituent derived from aralkylation with styrenic monomers, e.g styrene, p-methyl styrene, t-butyl styrene, mixed t-butyl styrenes, α-methyl styrene, and vinyl toluenes.

II. Polyhydroxy mononuclear and polynuclear phenolic monomers include:

(1) Hydroquinone, resorcinol, and catechol;

(2) Alkyl or aralkyl, mono and disubstituted, hydroquinones

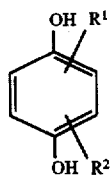

wherein the substitutions of $R^1$ and $R^2$ on the ring include 2,3; 2,5; and 2,6, and $R^1$ and $R^2$, independently, can be hydrogen, alkyl having 1–10 carbon atoms, and aralkyl derived from styrenes as benzylic derivatives, as previously described. $R^1$ and $R^2$ can also be divinyl aromatics, which can give rise to chain extended systems, as taught herein, for monohydroxy phenolic monomers. The latter system advantageously requires minimal incorporation of the dihydroxy monomer into the polymeric product to achieve the desired high hydroxy functionality.

(3) Alkyl or aralkyl, monosubstituted resorcinol:

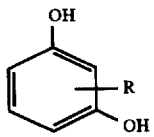

wherein R is in the 2, 4, or 5 position on the ring. R can be hydrogen, alkyl having 1–10 carbon atoms, aralkyl derived from styrenes or benzylic derivatives, as previously described. R can be divinyl aromatic, which can give rise to chain extended systems, as taught for the monohydroxy phenolic monomers. Advantages of the latter systems include minimal incorporations of the subject monomer into an alkylation polymer to achieve the desired high hydroxy functionality.

Resorcinol can also be used in the disubstituted (alkyl or aralkyl) mode to produce lower functionality polymers and in combination with difunctionally reactive monomers such as hydroquinone or monosubstituted phenolics, as described herein.

(4) Alkyl or aralkyl, substituted catechol

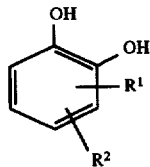

wherein the substitutions of $R^1$ and $R^2$ on the ring include 3,4 or 3,5 and wherein $R^1$ and $R^2$ independently, can be hydrogen, alkyl having 1–10 carbon atoms, aralkyl derived from styrenes, or benzylic derivatives, as previously described. $R^1$ and $R^2$ can also be divinyl aromatics, which can give rise to chain-extended systems, as taught for the monohydroxy phenolics. The latter system also advantageously requires minimal incorporation of the dihydroxy monomer into the polymeric product to achieve the desired high hydroxy functionality.

(5) Alkyl or aralkyl, substituted polyhydroxy-polycyclic aromatic phenols. Examples include:
(a) Dihydroxynaphthalenes: 1,2; 1,3; 1,4; 1,5; 1,6; 1,7; 1,8; 2,3; 2,4; 2,5; 2,6; 2,7; 2,8.
(b) Dihydroxy derivatives of anthracene, phenanthracene, etc.

III. Polynuclear phenolic monomers include:
(1) Bisphenol A;
(2) Bisphenol F;
(3) Dihydroxy biphenyl-bisphenols derived by various means
 a) p,p'dihydroxybisphenyl.
 b) disubstituted bisphenols derived from coupling of monosubstituted alkyl phenolics by action of the enzymatic coupling of phenols (Mead Process). The Mead Process is described in, for example, U.S. Pat. No. 4,900,671 which is hereby incorporated by reference.
(4) Bisphenols or polymeric phenols coupled by aldehydes or ketones.

These phenolic monomers are employed as an initial phenolic monomer in the reaction and may also be employed as an additional phenolic monomer later in the reaction. Preferred phenolic monomers for use in the present invention are bisphenol A and bisphenol F. Other preferred phenolic monomers include hydroquinone, resorcinol, p-t-butyl phenol, p-cumyl phenol, and p-octyl phenol. Polymers produced from the above monomers may also be used as the phenolic monomer. The present invention is especially useful for those phenolic monomers having a high melting point which may be susceptible to thermal degradation.

The aryl diolefin is used at a range of mole ratios relative to the phenolic monomer. The preferred mole ratio of aryl diolefin to phenolic monomer may be from 0.2:1 to 1.1:1. A mole ratio near to or greater than one is normally used under circumstances in which alkyl or aralkyl substituted phenolics are used and in which a higher molecular weight product is desired. The lower end of the mole ratio range is employed under circumstances where a low level of chain extension is desired. The amount of aryl diolefin also depends on the amount of phenolic hydroxy substitution on the phenolic prepolymer or monomer used. In the case of bisphenol A (which is a di-functional phenolic monomer having four activated ring sites for ready alkylation reaction), less aryl diolefin may be required to give a desired degree of phenolic functionality, because the phenolic monomer is higher in both molecular weight and functionality to start with. Similarly, a formaldehyde-linked phenolic polymer can be further coupled with aryl diolefins to build molecular weight to desired levels. A more preferred range of mole ratio of the aryl diolefin to phenolic monomer is 0.4:1 to 0.8:1.

The ultimate degree of styrenation employed with this polymer class can also vary. For the purposes of this invention, the degree of styrenation is defined as the ratio between the total moles of styrenic monomers used and the molar equivalent of open reactive positions per phenolic monomeric component. As noted above, in addition to the first portion of the styrenic monomer, it is optional and often preferred to include a second portion of styrenic monomer added after the diolefin coupling reaction. The degree of styrenation contributed by both the first and second portions of styrenic monomers is determined by subtracting the theoretical number of reactive positions used to couple with the aryl diolefin or other linking group from the total number of reactive positions per monomers. For example, phenol is considered to have 3 reactive positions. If two phenol molecules are coupled with an aryl diolefin, two open positions remain per phenol ring. The theoretical mole ratio for styrenation (moles of styrene per phenol molecule) is therefore 2. For the present invention, the effective range for styrenation may be from 20 to 100 percent of the theoretical mole ratio with a more effective range being 40 to 95 percent of theoretical. Normally, the synthesis is conducted to obtain at least 60% of the theoretical extent of styrenation.

In accordance with the present invention, a reaction between the phenolic monomer and at least one styrenic monomer is initiated in the presence of an acid catalyst. Since the system is generally low in water content, the effective acidity of the catalyst system is increased.

Acid catalysts which may be used include, but are not limited to:

Alkylsulfonic acids—methane, ethane, and higher alkyl $C_3-C_{10}$;

Arylsulfonic acids, toluene, xylene, and mixtures thereof; also, naphthalene sulfonic and aralkylated toluene, benzene, or naphthalene sulfonic acids containing $C_1-C_{10}$ alkyl substituents;

Phenol sulfonic and sulfonated phenolic polymers which may include aralkylated phenolics;

Sulfuric acid;

Phosphoric acid;

Alkyl, aryl or aralkyl phosphate esters having at least one free acidic proton per molecule;

Hydrochloric acid;

Latent acid catalyst systems including organic acid chlorides, phosphorous oxychlorides, and the like;

Latent acid catalysts derived from amines and the above;

Oxalic acid, maleic acid and other strong organic diacids having initial pKa's <1.5; and Halogenated organic acids such as chloroacetic and trifluoroacetic acid.

The amount of acid catalyst required depends on the effective acidity and type of catalyst selected. Strong acids such as sulfonic and methane sulfonic require quantities less than 0.20 percent based on the total reactive charge providing that said reactants do not contain basic impurities. It will be noted that dilute solutions of said acids can be used providing that provisions are made to remove water from the reaction mixture. Weaker acids require the use of larger quantities (quantities of catalyst) with those skilled in the art being familiar with methods for optimization.

As noted above, the temperature of the aralkylation and aryl diolefin coupling reactions depends on a number of factors and is generally between 130°–180° C., most often between 140°–170° C. The temperature selected depends on the nature of the aralkylating agent and requires optimization for each system. In some instances, high temperatures are desired to insure against o-aralkylation of the phenolics or in others lower temperatures are desirable to minimize retroaralkenylation with the resultant formation of undesired aryl olefin coupling products. In any case, the reaction time required can vary significantly, but is generally achieved in the 10 minute to one hour time frame at the average (140°–160° C.) reaction temperature. This combination of conditions can be applied to all combinations of phenol, substituted phenols, and phenol aralkylation products with either styrene, its derivatives, or aryl diolefins. It is worth noting that the aralkylation reaction is stopped completely by neutralization of the acid catalyst, and that systems so stabilized can be heated to temperatures in the 200°–250° C. range for substantial periods without de-aralkylations or other similar decompositions.

The phenolic monomer is selected to provide an aralkylated phenol and in the method of this invention is preferably bisphenol A or bisphenol F. Additional phenolic monomers may be added prior to reacting the aralkylated phenol with the aryl diolefin such as p-t-butyl phenol, p-cumyl phenol and p-octyl phenol. It is within the skill of the art to determine what phenolic monomers are appropriate to react with the styrenic monomer to obtain an aralkylated phenol and what phenolic monomers may be added later to build the various polymer structures.

The aralkylated phenol product is then reacted with an aryl diolefin to obtain a phenol aralkylation polymer, with the aralkylated phenol joined to the aryl diolefin primarily at the o-position. If needed, the pH of the reaction mixture may be lowered by means of acid catalyst addition. The same catalysts can be considered for diolefin reaction with the styrenated phenols as were used to promote the reaction of phenol or its derivatives with aryl olefins. Indeed, in practice of this invention, the same catalyst system is normally used to conduct the divinyl aromatic monomer-phenol polymerization reaction as was used for the precursor phenolic reactant styrenation often without any need for further addition of catalyst.

After conducting the aralkylation reactions, the final product can be neutralized with caustic, potassium hydroxide, or generally any alkaline material.

The acid catalyst may be any effective acid catalyst and is preferably methane sulfonic acid. However, the catalyst systems described earlier may be employed with advantage depending on the results desired. It will be noted that under conditions when neutralization of the catalyst with its removal by filtration is performed, that mineral acids may represent the most desired catalyst. For example, sulfuric or phosphoric acid are readily removed as their sodium or potassium neutralization salts. In contrast, under conditions where organic neutralization salts may be of an advantage by allowing their retention in the final product as a dissolved phase, the use of organic hydrophobic catalysts such as the alkyl naphthalene sulfonic acids and their amine neutralization products may be of an advantage. Amines can be selected from the group including primary, secondary and tertiary aliphatic ($C_1-C_{10}$) and aralkyl amines in which the amine substituents can be aromatic or benzylic in combination with aliphatic components ($C_1$ to $C_{10}$). A good neutralizing amine for purposes of these products would be diethyltertiary butyl amine.

To facilitate a more complete understanding of the invention, a number of Examples are provided below. The scope of the invention, however, is not limited to specific embodiments disclosed in these Examples, which are for purposes of illustration only..

EXAMPLE 1

A phenol aralkylation polymer was prepared at a bisphenol-A:divinyl benzene:para-tert-butylstyrene mole ratio of about 1:0.5:2.0 as follows:

A stainless steel pilot plant reactor was purged with nitrogen after thoroughly cleaning with alternate solvent and caustic washes. A first portion of styrenic monomer (para-tert-butylstyrene (1232 g) was charged to the reactor. Next, a phenolic monomer (1742 g of bisphenol-A) was slowly added to the rector with agitation at low speed to form a para-tert-butylstyrene/bisphenol-A slurry. At this point, the reactor contents were placed under a nitrogen atmosphere and heated with agitation to a temperature of 120° C. Then, an aralkylation catalyst (2.27 g of methane sulfonic acid [70% MSA]) was slowly added to the reactor over a period of 5 minutes to initiate a vigorous exotherm. The exotherm was allowed to achieve its maximum potential temperature (generally 180° to 190° C.). The temperature, however, should normally not be permitted to exceed 195° C. If the temperature exceeds 185° C., external cooling normally should be initiated. Generally, the exotherm will occur within 10 minutes of the 'MSA addition. A 30 minute reaction period is typically provided after addition of the MSA with the temperature being maintained in the 160°–170° C. range.

Next, an aryl diolefin (786.0 g of 63% divinylbenzene) was added over a period of 30 minutes. An exotherm will be observed during the initial stage of this charge, but the temperature should not be allowed to exceed 190° C. During this period, the reactor temperature is maintained at a minimum of 180° C. After the 30 minute divinylbenzene addition period, the temperature is held for an additional 30 minutes at 180° C. Next, a second portion of styrenic monomer (1232 g of para-tert-butylstyrene) was added over a period of 30–60 minutes, while maintaining the reactor temperature at 190° C. After the para-tert-butylstyrene addition is complete, the reactor is maintained at 180° C. for 30 minutes. At the end of this period, the reactor is cooled to 150° C. and 643.9 g of 50% potassium hydroxide are added to neutralize the acid catalyst. After neutralization, the reactor contends are discharged onto a flaker and the polymer product is flaked to a desired size.

EXAMPLES 2–18

In the following examples, the basic procedure of Example 1 was reproduced. Bisphenol-A was used as the phenolic monomer and DVB was used as the aryl diolefin. The styrene monomer was one of para-tert-butylstyene, indicated in the following tables as (PTBS), para-methylstyrene, identified as (PMS), or styrene. In each example, methane sulfonic acid (MSA), at a concentration of 70% by weight, was used as the aralkylation catalyst in an amount of 0.0022 mole per mole of bisphenol-A. The DVB was added in an amount of 0.5 mole per mole of bisphenol-A. In the absence of any styrenic monomer, the bisphenol-A was initially melted at 160° C. before adding the MSA. When slurried with the styrenic monomer, the bisphenol-A/styrenic monomer slurry was heated to 120° C. before adding the MSA then allowed to exotherm (and heated if needed) to 160° C., and held for 15 minutes. DVB was added in each case over a 15 minute period and then held at least an additional 15 minutes. If a styrenic monomer was added after the DVB (e.g. a second portion), it was added at the expiration of the 15 minutes and the addition period was 15 minutes. In examples 2 and 18, the bisphenol-A and DVB were allowed to react at 160° C. for 30 minutes before recovering the product. In all other cases, once all of the reactants were combined, the reaction mixture was held at 160° C. for 60 minutes before recovering the product. Table 1 records (1) the identity and amounts of the styrenic ingredient (relative to one mole of bisphenol-A) including (i) the first portion of styrenic monomer, and (ii) the amount of the second portion of styrenic monomer (2) the weight average molecular weight and polydispersity of the resulting polymers (measured using standard procedures of gel permeation chromatography and using a THF mobile phase), (3) the glass transition temperatures of the polymers (measured using standard differential scanning calorimeter (DSC) techniques and (4) non-polar solvent solubility of the polymers (using the test described hereafter).

Non-polar Solvent Solubility Test

The aralkylation polymers made in these examples were examined according to the following procedure to assess their compatibility in non-polar systems. A sufficient amount of the polymer sample (usually about 10 grams) is dissolved in a 50/50 (percent by weight) mixture of o-xylene (about 5 grams) and linseed oil (about 5 grams) (with heating if needed) to produce a solution of 50 percent by weight polymer solids. Thereafter, mineral spirits was slowly added to the polymer solution (with stirring) to a cloud (persistent turbidity) end point. The amount of mineral spirits (in grams) added for a particular sample provides a measure of the polymer's nonpolar solvent solubility potential. Two replicates were performed. The average of both values is reported in Table 1.

TABLE 1

| Example No. | Styrene Derivative | First Styrene Portion (Moles) | Second Styrene Portion (Moles) | Molecular Weight | Polydispersity | Glass Transition Temperature (°C.) | Nonpolar Solvent Solubility |
|---|---|---|---|---|---|---|---|
| 2 | None | — | — | 1078 | 2.164 | 11.1 | 3.2 |
| 3 | PMS | 0.3 | — | 1356 | 2.390 | 18.2 | 3.4 |
| 4 | PTBS | 0.15 | 0.15 | 1358 | 2.239 | 20.7 | 4.8 |
| 5 | Styrene | 0.15 | 0.15 | 1078 | 2.054 | 12.6 | 4.6 |
| 6 | PMS | — | 0.3 | 1005 | 1.998 | 9.4 | 5.6 |
| 7 | Styrene | 1.0 | — | 1213 | 2.148 | 18.0 | 5.7 |
| 8 | PTBS | 1.0 | — | 1604 | 2.130 | 38.3 | 9.3 |
| 9 | PMS | 0.5 | 0.5 | 1253 | 1.973 | 24.7 | 8.0 |
| 10 | PMS | 0.5 | 0.5 | 1155 | 1.963 | 17.8 | 8.4 |
| 11 | PMS | 0.5 | 0.5 | 1472 | 2.130 | 25.6 | 5.7 |
| 12 | PTBS | — | 1.0 | 1431 | 2.159 | 31.9 | 12.2 |
| 13 | Styrene | — | 1.0 | 944 | 1.843 | 31.0 | 8.9 |
| 14 | PMS | 2.0 | — | 1469 | 2.107 | 35.4 | 9.8 |
| 15 | PTBS | 1.0 | 1.0 | 1403 | 2.065 | 49.7 | 40.0 |
| 16 | Styrene | 1.0 | 1.0 | 1030 | 2.271 | 9.6 | 9.3 |
| 17 | PMS | — | 2.0 | 1214 | 2.252 | 18.6 | 14.1 |
| 18 | None | — | — | 1253 | 1.973 | 9.9 | 2.9 |

It will be apparent to those skilled in the art that various modifications and variations can be made in the compositions and methods of the present invention without departing from the spirit or scope of the invention. Thus, it is intended that the present invention cover the modifications and variations of this invention provided they come within the scope of the appended claims and their equivalents.

What is claimed is:

1. In a process of producing a phenol aralkylation polymer by reacting a phenolic monomer, a styrenic monomer and an aryl diolefin, the improvement comprising (i) preparing a mixture of a phenolic monomer in a first portion of a styrenic monomer, (ii) adding an aralkylation catalyst to the mixture to initiate a reaction between the phenolic monomer and the styrenic monomer and obtain an aralkylated phenol, (iii) adding an aryl diolefin to the aralkylated phenol to initiate a reaction between the aralkylated phenol and the aryl diolefin and obtain a phenol aralkylation polymer and optionally (iv) thereafter adding a second portion of a styrenic monomer to the phenol aralkylation polymer to obtain further aralkylation of the polymer.

2. The process of claim 1 wherein the styrenic monomer is selected from the group consisting of styrene, α-methyl styrene, p-t-butyl styrene, p-ethyl styrene, m-ethyl styrene, p-vinyl toluene, mixed vinyl toluenes, mixed t-butyl styrenes, mixed ethyl styrenes, mixed t-butyl styrenes with di-t-butyl styrenes, and mixtures thereof.

3. The process of claim 2 wherein the styrenic monomer is selected from the group consisting of α-methyl styrene, p-t-butyl styrene, p-vinyl toluene, mixed vinyl toluenes and mixtures thereof.

4. The process of claim 2 wherein the aryl diolefin is selected from the group consisting of m-diisopropenylbenzene, p-diisopropenylbenzene, mixed diisopropenylbenzenes, m-divinylbenzene, p-divinylbenzene, and mixed divinylbenzenes.

5. The process of claim 4 wherein the phenolic monomer is selected from the group consisting of bisphenol A, bisphenol F, hydroquinone, resorcinol and catechol.

6. The process of claim 1 wherein all or a portion of the aryl diolefin is derived by dehydration of benzylic diols.

7. A process for preparing a phenol aralkylation polymer by reacting (a) a phenolic monomer selected from the group consisting of bisphenol A, bisphenol F, hydroquinone, resorcinol and catechol, (b) a styrenic monomer selected from the group consisting of styrene, alpha-methyl styrene, para-tert butyl styrene and mixtures thereof and (c) divinyl benzene comprising (i) preparing a slurry of phenolic monomer in a first portion of a styrenic monomer, (ii) adding an aralkylation catalyst to the slurry to initiate a reaction between the phenolic monomer and the styrenic monomer which heats the slurry to a temperature in the range of 140° to 170° C. and obtain an aralkylated phenolic monomer, (iii) adding divinyl benzene to the aralkylated phenolic monomer to initiate a reaction between the aralkylated phenolic monomer and the aryl diolefin and obtain a phenol aralkylation polymer and (iv) thereafter optionally adding a second portion of the styrenic monomer to the phenol aralkylation polymer to obtain further aralkylation of the polymer.

8. The process of claim 7 using bisphenol A as the phenolic monomer, from about 0.3 to 0.8 mole of an aryl diolefin per mole of bisphenol A and sufficient styrenic monomers to have from 20 to 100 percent of the open reactive sites of the polymer occupied by styrene derived moieties.

* * * * *